(12) United States Patent
Huang et al.

(10) Patent No.: US 9,716,400 B2
(45) Date of Patent: *Jul. 25, 2017

(54) WIRELESS CHARGING SYSTEM WITH AUTO-DETECTION

(71) Applicant: Knowmax Technology Ltd., New Taipei (TW)

(72) Inventors: Kuo-Chan Huang, Taipei (TW); Che-Ying Li, New Taipei (TW)

(73) Assignee: Knowmax Technology Ltd., New Taipei (TW)

( * ) Notice: Subject to any disclaimer, the term of this patent is extended or adjusted under 35 U.S.C. 154(b) by 100 days.

This patent is subject to a terminal disclaimer.

(21) Appl. No.: 14/527,529

(22) Filed: Oct. 29, 2014

(65) Prior Publication Data

US 2015/0115883 A1 Apr. 30, 2015

(30) Foreign Application Priority Data

Oct. 29, 2013 (TW) .............................. 102139165 A (51) Int. Cl.
*H02J 7/00* (2006.01)
*H02J 7/02* (2016.01)
*H02J 50/90* (2016.01)
*H02J 50/80* (2016.01)
*H02J 17/00* (2006.01)

(52) U.S. Cl.
CPC .............. *H02J 7/025* (2013.01); *H02J 17/00* (2013.01); *H02J 50/80* (2016.02); *H02J 50/90* (2016.02)

(58) Field of Classification Search
CPC .. H02J 7/025; H02J 17/00; H02J 17/10; H02J 50/80; H02J 50/90
USPC ........................................................ 320/108
See application file for complete search history.

(56) References Cited

U.S. PATENT DOCUMENTS

| | | | | |
|---|---|---|---|---|
| 7,378,757 B2 * | 5/2008 | Nakata | ...................... | H02J 7/35 307/71 |
| 2008/0111518 A1* | 5/2008 | Toya | ...................... | H02J 7/025 320/108 |
| 2010/0084918 A1* | 4/2010 | Fells | ........................ | H02J 5/005 307/32 |
| 2013/0249306 A1* | 9/2013 | Kim | ........................ | H02J 17/00 307/104 |
| 2013/0307346 A1* | 11/2013 | Arisawa | .................. | H01F 38/14 307/104 |
| 2014/0132210 A1* | 5/2014 | Partovi | ................... | H02J 5/005 320/108 |
| 2014/0266019 A1* | 9/2014 | Pigott | .................... | H02J 7/025 320/108 |

* cited by examiner

*Primary Examiner* — Nathaniel Pelton
(74) *Attorney, Agent, or Firm* — Muncy, Geissler, Olds & Lowe, P.C.

(57) ABSTRACT

A wireless charging system with auto-detection with an inductive loop for detecting an induced electric field resulted from the approach of an electrical receiver device to determine whether the electrical receiver device is close enough and thus adjust the output to the inductive loop from the power loop.

18 Claims, 12 Drawing Sheets

WIRELESS CHARGING SYSTEM WITH AUTO-DETECTION

TECHNICAL FIELD

The present invention relates to a charging system, and more particularly, to a wireless charging system.

BACKGROUND

Also known in the art, wireless charging is so-called as an inductive charging, non-contact induction charging which is completed by near-field sensing for inductively coupling, and the power supply device transfers power energy to electric receiver devices. The electric receiver devices receive the power energy for charging its battery, and also for its own operational use. Because the charger transfers power energy to the electric receiver devices by inductive coupling, between the charger and the electric receiver devices are without wires connection and without conductive contacts exposed.

Specifically, the wireless charger has a coil, wherein AC electromagnetic field is generated by the AC via the coil. There is another coil in the electric receiver device for receiving the AC electromagnetic field, and converted into electrical energy for charging its battery for providing power to the device. This scheme is the same as the transformer which a primary winding and a secondary winding are put on the charger and the electric receiver device, respectively. If the distance between the charger and the electric receiver device is farther, it would need to add a resonant inductive coupling.

Wireless charging has the advantages as followings: (i) security: no need of energized contacts to avoid the risk of electric shock; (ii) durability: power transmission components without exposing, and therefore will not be eroded by moisture, oxygen in the air. Because no contacts exist, so there is no mechanical wear and flashover in connection or separation of components; (iii) making medical implant devices more security: in the implanted medical device, it does not damage to the human body's tissue as charging the implanted medical device in the human body, and without the need for wires to charge through the skin and other tissues of the body, eliminating the risk of infection; (iv) convenient: no need for wire connection while charging, as long as the charger is put nearby. Technically, a charger can charge for a plurality of electric receiver devices, in the case where a plurality of electric receiver devices are used without multiples chargers (may be omitted), without a plurality of electrical sockets, and without a plurality of wires wound around each other.

However, the current wireless charging system does not have a mechanism of auto-detection for under-charged electric devices. Mostly, it uses a timing charging method and the timing charging method will create a waste of electricity, and if the under-charged electric device is faulty or damaged it may cause a fire accident.

SUMMARY OF THE INVENTION

To address the above-mentioned issues, the invention provides a wireless charging system with auto-detection for under-charged electric device.

According to one aspect of the invention, it provides a wireless charging system with auto-detection, comprising an inductive loop including an induction coil and a capacitor, wherein the induction coil and the capacitor are connected in series. A power loop includes a power source, wherein the power loop is connected to the inductive loop, A control loop includes a processor, a detection circuit, coupled to the processor and a detection point of the inductive loop so that the processor can detect a variation of an induced electric field of the inductive loop due to an electric receiver device approaching to the inductive loop, wherein a first current or a first voltage of the inductive loop is created by the induced electric field as an induced waveform over time; and a control line, coupled to the processor and the power loop so that the process can control a power supply of the power loop outputted to the inductive loop; wherein the processor determines whether the electrical receiver device is close enough to the inductive loop or not based on the induced electric field, to adjust the power supply of the power loop outputted to the inductive loop.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
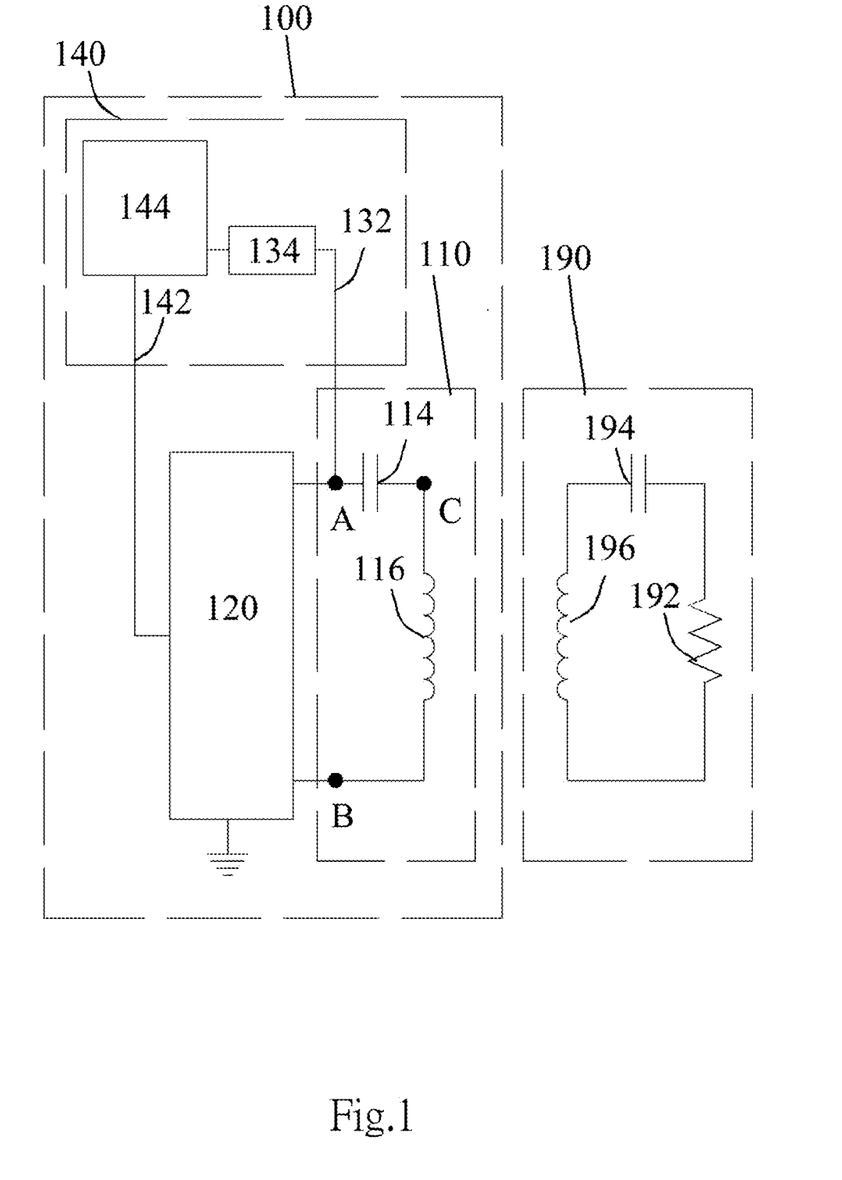
FIG. 1 illustrates a schematic view of one example of a wireless charging system, and an electric receiver device according to one embodiment of the present invention.

FIG. 1 is a schematic view of one example of a wireless charging system 100, and an electric receiver device 190 according to one embodiment of the present invention. A rechargeable battery can be embedded into the electric receiver device 190, for example a mobile phone, tablet, flashlight, electric shaver, electric toothbrush, battery containing charger, notebook, juice machine, etc., which has an energy receiving coil constituted by a resonance resistance 192, a resonant capacitor 194, and a resonant inductor 196.

As shown in FIG. 1, the wireless charging system 100 of the present invention may include an inductive loop 110 comprising an induction coil 116 and a capacitor 114, wherein the induction coil 116 and the capacitor 114 are connected in series. When the electric receiver device 190 is approaching to the inductive loop 110, electromagnetic induction is generated between the inductive loop 110 and the energy receiving coil of the electric receiver device 190, and thereby energy transmitting from the induction coil 116 of the inductive loop 110 to the resonant inductor 196 of the electric receiver device 190, so that the electric receiver device 190 will be able to achieve the purpose for charging. The inductive loop 110 is connected to a power loop 120, and the power loop 120 includes a power supply to provide power to the inductive loop 110.

The wireless charging system 100 of the present invention further comprises a control loop 140 including a processor 144, a detection circuit 132 by which the processor 144 is connected to the inductive loop 110, for the processor 144 to detect (process) an induced electric field of the inductive loop 110 and its variation as the electric receiver device 190 is close to the inductive loop 110. A waveform 320a with respect to time of a first current or a first voltage of the inductive loop 110 created by the induced electric field is shown in FIG. 3A.

In addition, the control loop 140 further comprises a control line 142. The processor 144 is connected to the power loop 120 by the control line 142, to control a power supply of the power loop 120 outputted to the inductive loop 110. Based on the detected induced electric field, the processor 144 determines whether the electric receiver device 190 is close enough to the inductive loop 110 or not, to adjust the power supply of the power loop 120 outputted to the inductive loop 110; including, without increasing the power supply as the electric receiver device 190 is not close enough to the inductive loop 110, and reducing or terminating the power supply as the electric receiver device 190 is removed.

Optionally, the detection circuit 132 of the control loop 140 includes a filter 134, and an input terminal of the filter 134 is connected to a detection point of the inductive loop 110 in FIG. 1, for example a first detection point (A) between the power loop 120 and the capacitor 114, or a second detection point (B) between the power loop 120 and the induction coil 116, or a third detection point (C) between the capacitor 114 and the induction coil 116. Also, an output terminal of the filter 134 is connected to the processor 144. As the processor 144 has an excellent processing performance, the filter 134 may be omitted.

Figure 3A:
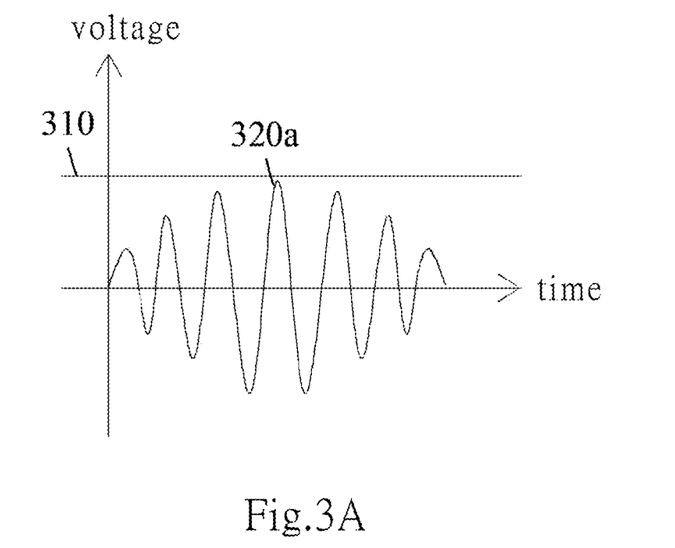
FIG. 3A illustrates a current or a voltage of the power loop induced by the induced electric field representing an induced waveform over time.
Figure 3B:
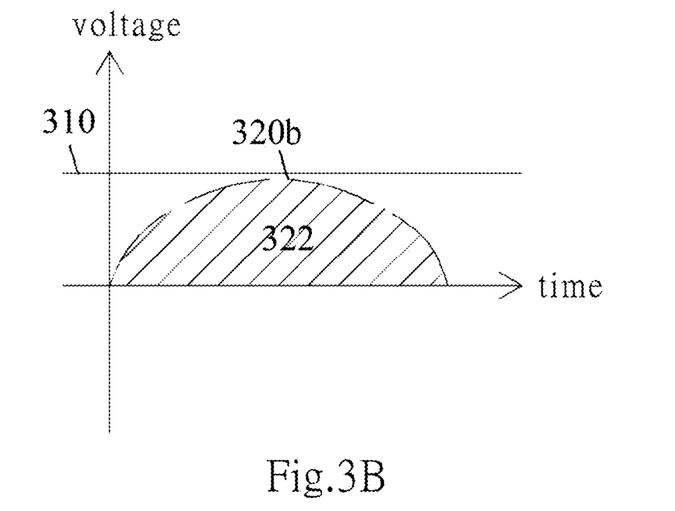
FIG. 3B illustrates a graph of the induced waveform with respect to time after filtering, and an area covered by the induced waveform.

FIG. 3A illustrates a graph of an induced waveform 320a with respect to time of a first current or a first voltage of the inductive loop 110 created by the induced electric field. FIG. 3B illustrates a graph of the induced waveform 320a of the FIG. 3A with respect to time after filtering, and an area 322 covered by the induced waveform 320a. As shown in FIG. 3A and FIG. 3B, the induced waveform 320a in FIG. 3A is filtered by the filter 134 for changing from a sawtooth waveform to an induced waveform 320b, as shown in FIG. 3B.

Figure 4A:
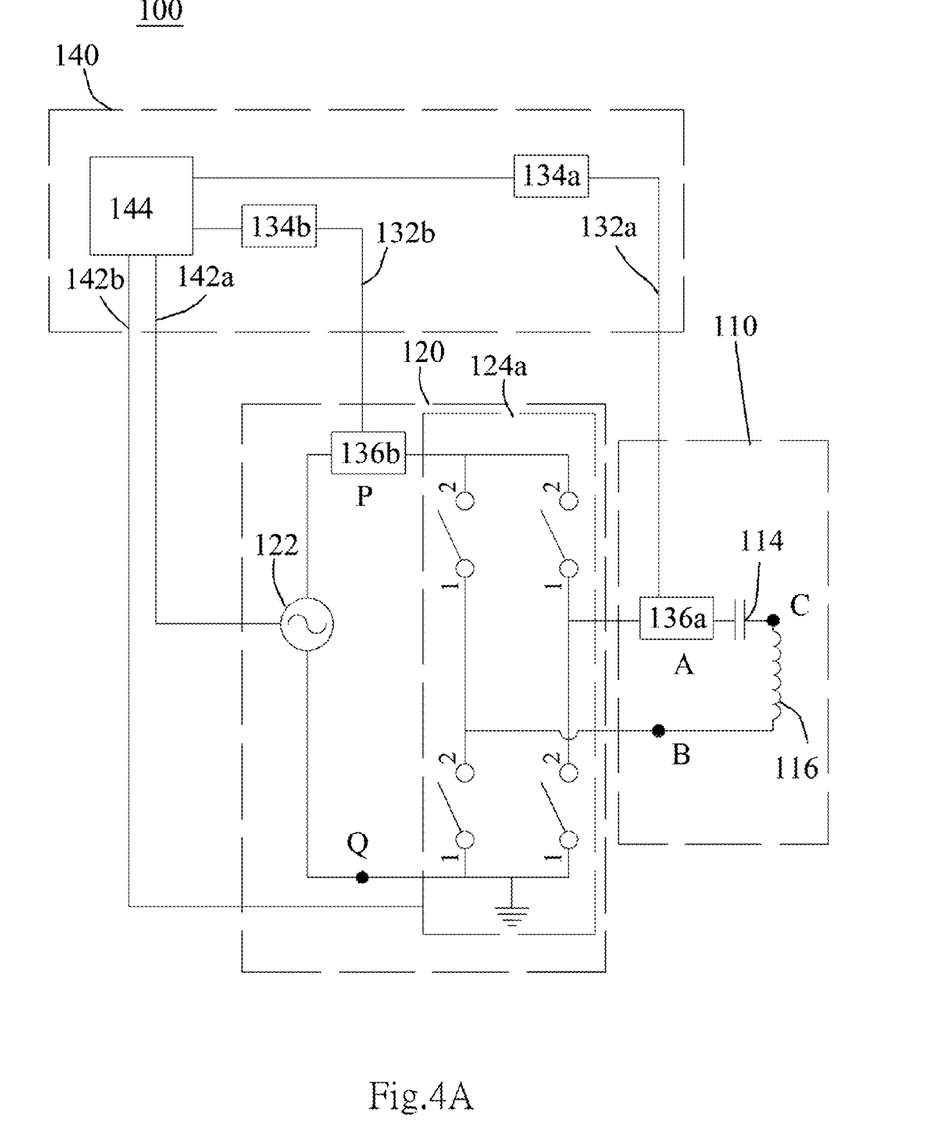
FIG. 4A illustrates a schematic view of one example of a wireless charging system using a full-bridge driving circuit.

FIG. 4A is a schematic diagram of the wireless charging system in FIG. 1 using a full-bridge driver circuit. In order to further improve the performance of detection, FIG. 4A adds some elements as compared to the structure of FIG. 1.

As shown in FIG. 4A, the detection circuit 132a of the control loop 140 includes a filter 134a, wherein an input terminal of the filter 134a is connected to a detection point of the inductive loop 110, such as a first detection point (A) between a driving circuit 124a and a capacitor 114, or a second detection point (B) between the driving circuit 124a and an induction coil 116, or a third detection point (C) between the capacitor 114 and the induction coil 116. And, an output terminal of the filter 134a is connected to the processor 144. The detection circuit 132a of the control loop 140 also includes a detector 136a, and the detector 136a may be disposed (configured) on the first detection point (A), the second detection point (B), or the third detection point (C) of the inductive loop 110 for detecting current of the inductive loop 110. As the processor 144 has an excellent processing performance, the filter 134 may be omitted.

In addition, a control line 142a of the processor 144 can be connected to a power source 122 of the power loop 120, and the processor 144 is used for controlling output power of the power source 122. Furthermore, the power loop 120 also includes a driving circuit 124a, and the power source 122 is connected to an input terminal of the driving circuit 124a. Two output terminals of the driving circuit 124a are connected to the capacitor 114 and the induction coil 116, respectively. In addition, the control loop 140 may further include an auxiliary control line 142, and the processor 144 is connected to control the driving circuit 124a via the auxiliary control line 142, and thereby controlling phase or frequency of the driving circuit (124a), so as to control the power supply providing to the inductive loop 110.

For various electric receiver devices 190, the induced waveforms 320a may have great differences therebetween due to different properties of electromagnetic induction. For example, amplitude of the induced waveform 320a may be too large or too small so that it is outside of the detectable range. Meanwhile, the induced waveform 320a may be adjusted to the detectable range by controlling the phase or frequency of the driving circuit 124a by the processor 144.

Figure 2:
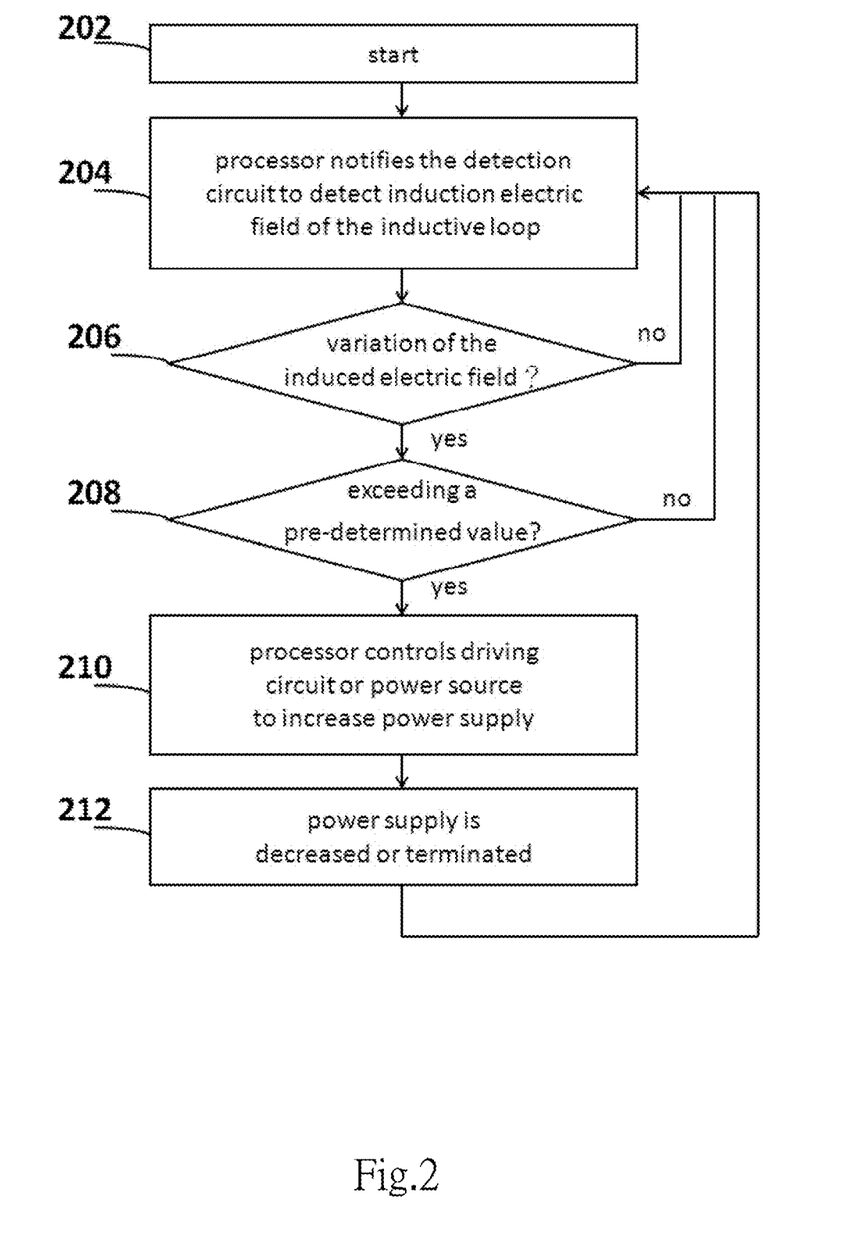
FIG. 2 illustrates a flow chart that the wireless charging system of the invention detects the electric receiver device and determines whether to increase the power supply for the electric receiver device for charging or not.

FIG. 2 illustrates a flow chart that the wireless charging system 100 of the invention detects the electric receiver device 190 and determines whether to increase the power supply for the electric receiver device 190 for charging or not. Please refer to FIG. 2, in step 202, it activates the wireless charging system 100 of the invention. Then, in step 204, the processor 144 notifies the detection circuit 132a to detect the inductive loop 110 to create the induced waveform 320a shown in FIG. 3A.

Figure 3C:
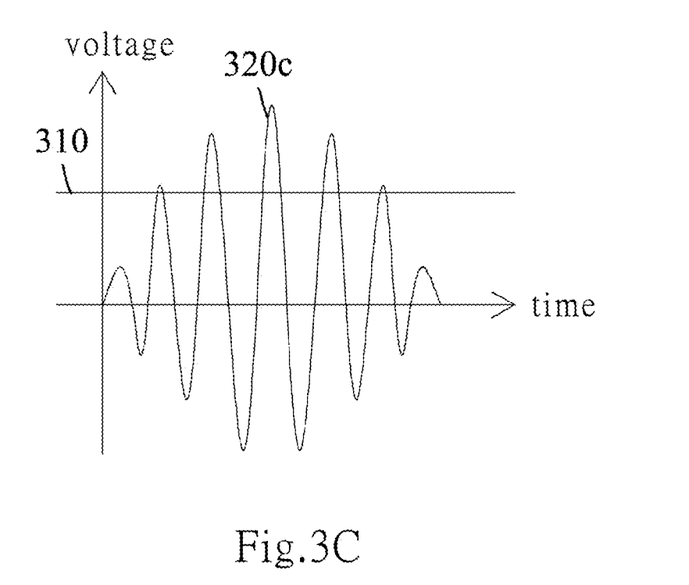
FIG. 3C illustrates a graph that a maximum peak of the induced waveform of the induced electric field is over a pre-determined peak value.
Figure 3D:
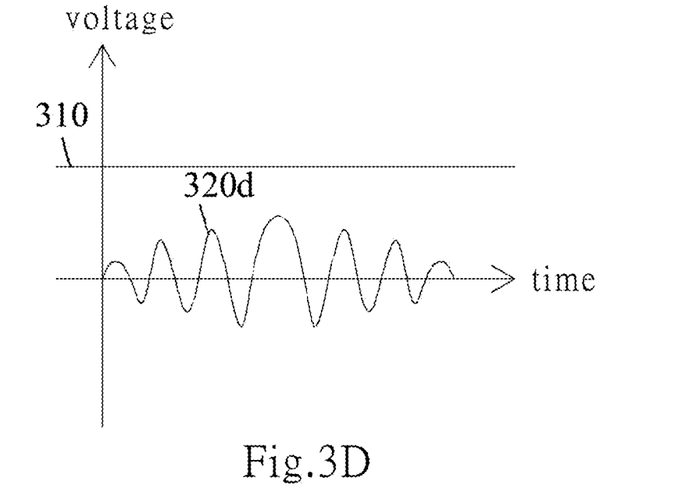
FIG. 3D illustrates a graph that a maximum peak of the induced waveform of the induced electric field is under a pre-determined peak value.

In step 206, it judges whether shape of the induced waveform 320a changes or not, to determine variation of the induced electric field. As the induced electric field changes, in step 208, it determines whether a maximum peak value or an average peak value of the induced waveform 320a is over a pre-determined (set) value, or whether an area 322 of the induced waveform 320a is over an pre-determined (set) value of area, or whether variation of the frequency of the induction wave is over an pre-determined (set) value of frequency. For example, FIG. 3C shows a graph that a maximum peak of the induced waveform 320c of the induced electric field is over (greater than) a pre-determined peak value 310, and FIG. 3D shows a graph that a maximum peak of the induced waveform 320d of the induced electric field is under (smaller than) a pre-determined peak value 310. As it is over the pre-determined value, in step 210, the processor 144 controls to increase output power of the power source 122 to the inductive loop 110. Or, the processor 144 may control phase or frequency of the driving circuit 124a via the auxiliary control line 142b to increase output power of the power source 122 to the inductive loop 110.

Finally, in step 212, as the processor 144 determines the electric receiver device 190 is already fully charged, the power supply is then decreased or terminated, and then back to the step 204, continuing to detect variation of the induced waveform 320a of the induced electric field. When the wireless charging system 100 of the invention is without the electric receiver device 190 approaching to, the step 204 can be performed per a period of time.

When the induced waveform 320a feedback from the detection circuit 132a with a noise signal does not meet the protocol specification so that it can not be used to determine whether the electric receiver device is approaching or not. As shown in FIG. 4A, in another embodiment, the power loop 120 further includes an auxiliary detection point. For example, the auxiliary detection point locates on a non-ground circuit of a first auxiliary detection point (P) between the power source 122 and the driving circuit 124a, or a ground circuit of a second auxiliary detection point (Q). Because possibility for the detection point of the inductive loop 120 and the auxiliary detection point of the power loop 120 with noise signals simultaneous is very low, it can improve the ability of determination for approach of an electrical receiver device by simultaneously detecting the detection point and the auxiliary detection point.

In other words, the control loop 140 of the wireless charging system 100 further includes an auxiliary detection circuit 132b connected to the power loop 120, for example, connected to the first auxiliary detection point (P) of the power loop 120 to detect the induced electric field. A current or a voltage of the power loop 120 induced by the induced electric field represents an auxiliary induced waveform over time. Then, the processor 144 examines the induced waveform 320a by a protocol, for example comparing a waveform of the protocol specification with the induced waveform 320a. As the processor 144 determines that the induced waveform 320a is not applicable, the induced waveform 320a may be replaced by the auxiliary induced waveform.

Similar with the detection circuit 132a, the auxiliary detection circuit 132b further includes a filter 134b, wherein an input terminal of the filter 134b is connected to the first auxiliary detection point (P) or the second auxiliary detection point (Q) of the power loop 120. An output terminal of the filter 134b is connected to the processor 144. Similarly, the auxiliary induced waveform may be filtered by the filter 134b for changing from a sawtooth waveform to a curve waveform. As the processor 144 has an excellent processing performance, the filter 134b may be omitted.

Similar with the detection circuit 132a, the auxiliary detection circuit 132b of the control loop 140 also includes an auxiliary detector 136b, and the auxiliary detector 136b may be disposed (configured) on the power loop 120, at an auxiliary detection point between the power source 122 and the driving circuit 124a, for example the first auxiliary detection point (P) or the second auxiliary detection point (Q), to detect current of the power loop 120.

As shown in FIG. 4A, a wireless charging system may include an inductive loop 110, a power loop 120 and a control loop 140. The inductive loop 110 comprises an induction coil 116 and a capacitor 114, wherein the induction coil 116 and the capacitor 114 are connected in series. The power loop 120 includes a power source 122 and a driving circuit 124a. The power source 122 is connected to an input terminal of the driving circuit 124a, and two output terminals of the driving circuit 124a are connected to the capacitor 114 and the induction coil 116.

The control loop 140 includes a processor 144, a detection circuit 132a, an auxiliary detection circuit 132b, a control line 142a, and an auxiliary control line 142b. The detection circuit 132a is coupled to the processor 144 and connected to a detection point of the inductive loop 110, for example a first detection point (A) between the driving circuit 124a and the capacitor 114, or a second detection point (B) between the driving circuit 124a and the induction coil 116, or a third detection point (C) between the capacitor 114 and the induction coil 116, for the processor 144 to detect (process) an induced electric field of the inductive loop 110. A first current or a first voltage of the inductive loop 110 induced by the induced electric field represents an induced waveform over time.

The auxiliary detection circuit 132b is connected to an auxiliary detection point of the power loop 120, for example, connected to the first auxiliary detection point (P) or the second auxiliary detection point (P) to detect the induced electric field. A current or a voltage of the power loop 120 induced by the induced electric field represents an auxiliary induced waveform over time. As the processor 144 determines that the induced waveform is not applicable by a protocol, the induced waveform may be replaced by the auxiliary induced waveform.

The processor 144 is connected to the power source 122 by the control line 142a so that the processor 144 can control a power supply of the power source 122 outputted to the inductive loop 110. The processor 144 is connected to the driving circuit 124a by the control line 142b so that the processor 144 can control a phase or a frequency of the driving circuit 124a to control the power supply of the inductive loop 110.

Based on the detected induction electric field, the processor 144 determines whether the electric receiver device is in a condition to adjust the power supply of the power loop 120 outputted to the inductive loop 110; and the condition including variation of the induced electric field due to approaching of the electric receiver device or power dissipation of the electric receiver device, etc.

Optionally, the detection circuit 132a includes a filter 134a, and an input terminal of the filter 134a is connected to the inductive loop 110. Also, an output terminal of the filter 134a is connected to the processor 144. The auxiliary detection circuit 132b includes an auxiliary filter 134b, and an input terminal of the auxiliary filter 134b is connected to the power loop 120. Also, an output terminal of the auxiliary filter 134b is connected to the processor 144.

Optionally, the filter 134a and the auxiliary filter 134b may be not directly connected to the processor 144; the filter 134a and the auxiliary filter 134b are connected to the processor 144 via a common circuit. An output terminal of the filter 134a and an output terminal of the auxiliary filter 134b are connected to an input terminal of the common circuit, and an output terminal of the common circuit is connected to the processor 144.

Optionally, the detection circuit 132a includes a detector 136a configured in the inductive loop 110 and connected to the induction coil 116 and the capacitor 114 in series. The auxiliary detection circuit 132b includes a detector 136b configured in the power loop 110 and connected to the driving circuit 124a and the power source 122.

Figure 4B:
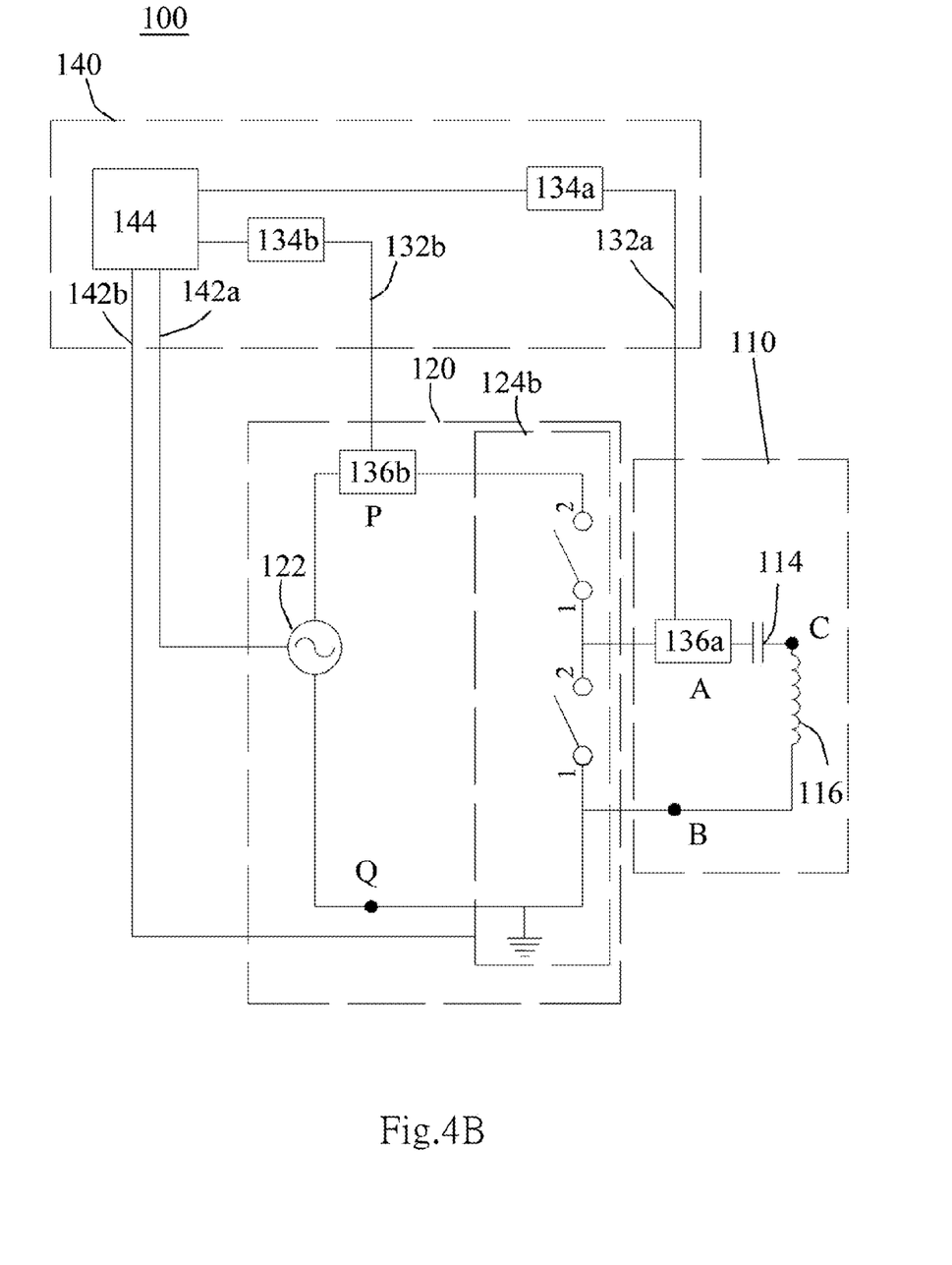
FIG. 4B illustrates a schematic view of one example of a wireless charging system using a half-bridge driving circuit.

The driving circuit is for example a full-bridge driver circuit 124a shown in FIG. 4A or a half-bridge driver circuit 124b shown in FIG. 4B. The half-bridge driver circuit 124b is used for adjusting the frequency, but not phase.

Figure 5:
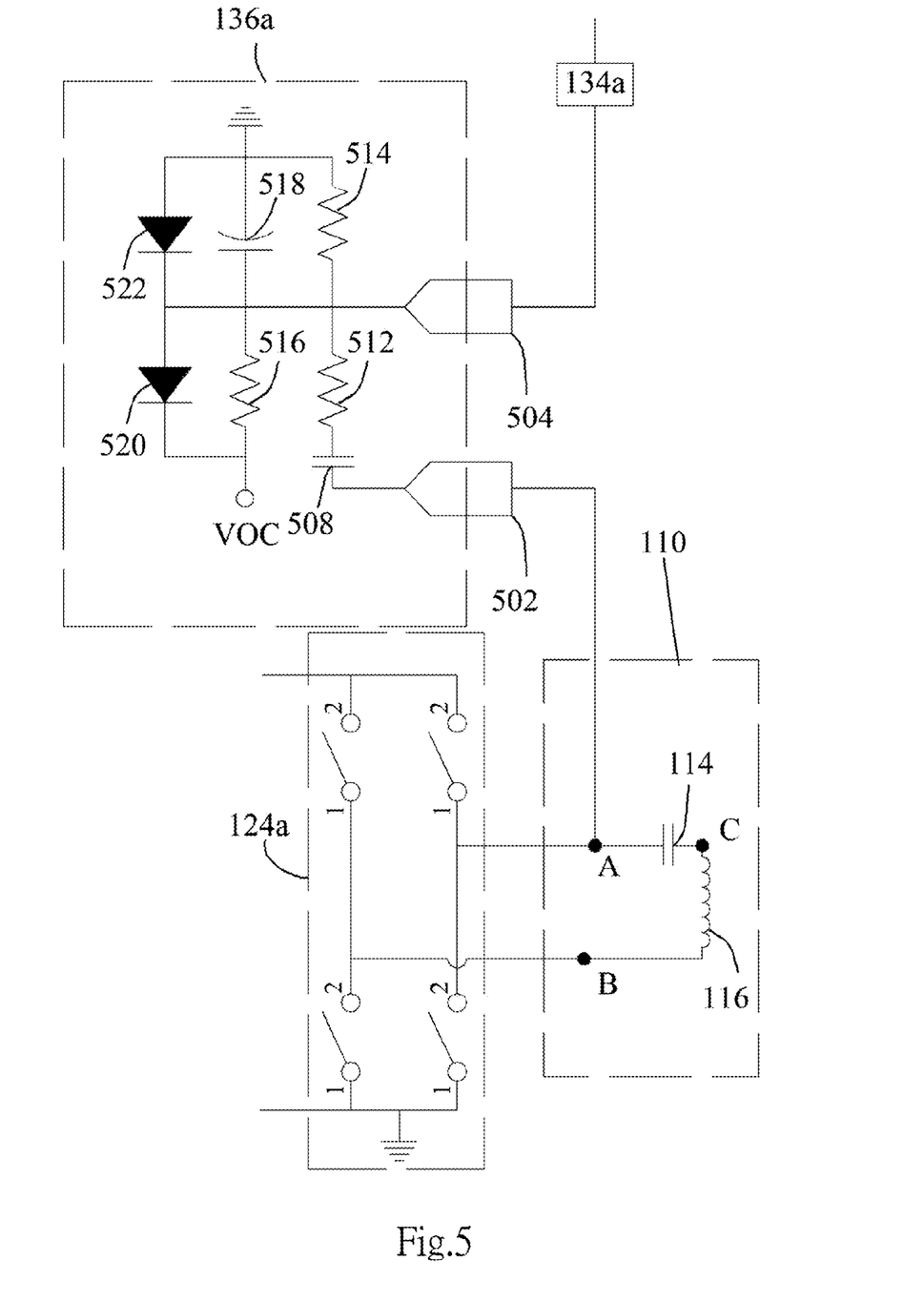
FIG. 5 illustrates a schematic view of one example of a wireless charging system of the FIG. 4A using a voltage-type driving circuit.

FIG. 5 is a schematic view of one example of a wireless charging system of the FIG. 4A, wherein the detector is a voltage-type detector. As shown in FIG. 5 and FIG. 4A, the detector 136a is a voltage-type detector, wherein a signal input terminal 502 is connected to a first detection point (A), a second detection point (B) or a third detection point (C) of the inductive loop 110, and wherein a signal output terminal 504 is connected to the filter 134a to detect voltage of the inductive loop 110, and its voltage signal may be transmitted to the processor 144 via the detection circuit 132a.

Optionally, the voltage-type detector may be used in the auxiliary detection circuit 132b to connect to the first auxiliary detection point (P) of the power loop 120. The first detection point (A), the second detection point (B) or the third detection point (C) of the inductive loop 110, or the first auxiliary detection point (P) of the power loop 120 may be connected by two voltage-type detectors at the same point, and subsequently connected to their respective filters to create different amplifications of voltage for providing the processor 144 to select preferable voltage signal. The two voltage-type detectors connected to their respective filters have a cost benefit than that of a single voltage-type detector connected to a single filter, because the whole cost of two filters with a lower modulation ratio reaching a higher modulation ratio of the single filter is less than that of the single filter. In other words, there are two detection lines, and each connected to the identical detection point, and each of connecting filter has a different modulation ratio to provide auxiliary induced waveform with different modulation ratio to the processor.

Figure 6:
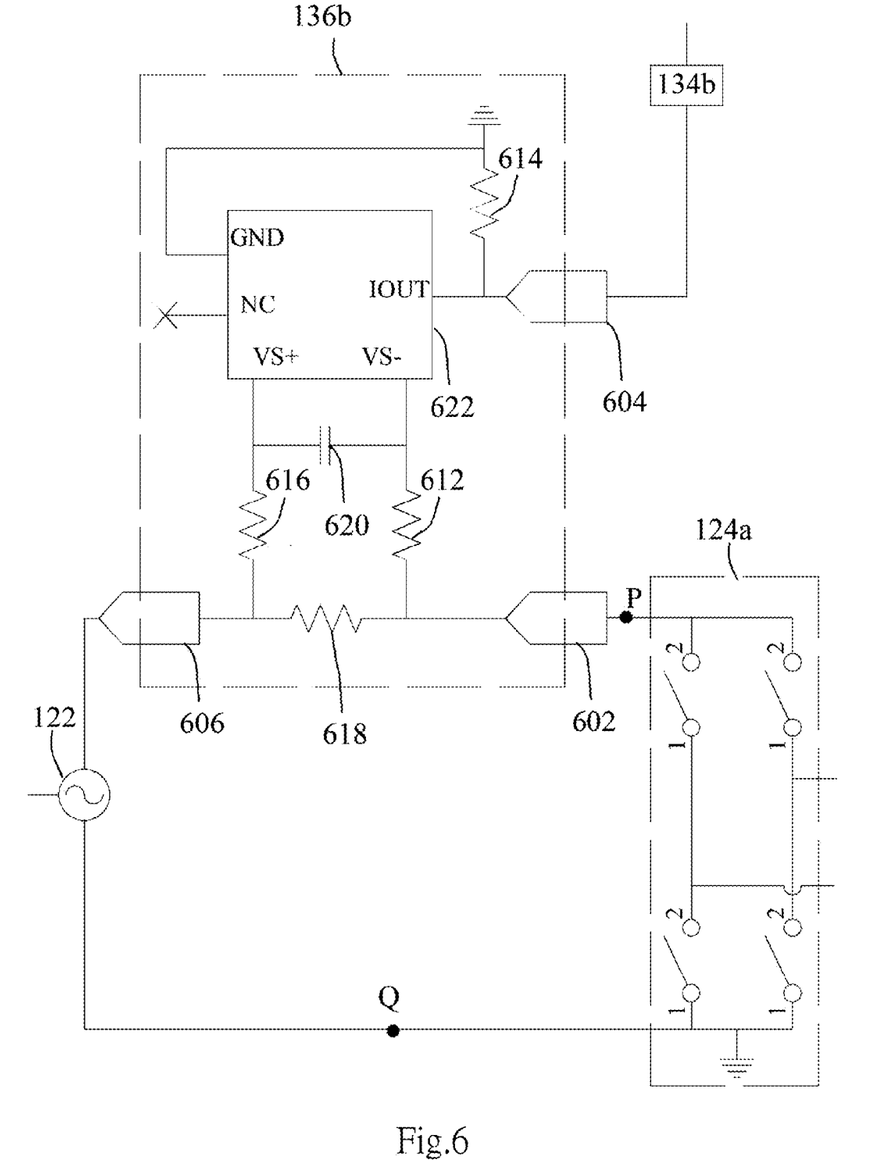
FIG. 6 illustrates a schematic view of one example of a wireless charging system of the FIG. 4A using a single output current-type driving circuit.

FIG. 6 is a schematic view of one example of a wireless charging system of the FIG. 4A, wherein the detector is a single output current-type detector. As shown in FIG. 6 and FIG. 4A, the detector 136b is a single output current-type detector located at the first auxiliary detection point (P) or the second auxiliary detection point (Q) of the power loop 120, wherein a first signal input terminal 602 is connected to the driving device 124a, a second signal input terminal 606 is connected to the power source 122, and a signal output terminal 604 is connected to the auxiliary filter 134b to detect current of the power loop 120, and its current signal may be transmitted to the processor 144 via the auxiliary detection circuit 132b.

Optionally, the single output current-type detector may be used in the detection circuit 132a located at a detection point of the induction loop 110, for example first detection point (A), the second detection point (B) or the third detection point (C). The first detection point (A), the second detection point (B) or the third detection point (C) of the inductive loop 110, or the first auxiliary detection point (P) and the second auxiliary detection point (Q) of the power loop 120 may be disposed by two single output current-type detectors at the same point, and subsequently connected to their respective filters to create different amplifications of current for providing the processor 144 to select preferable current signal.

Figure 7:
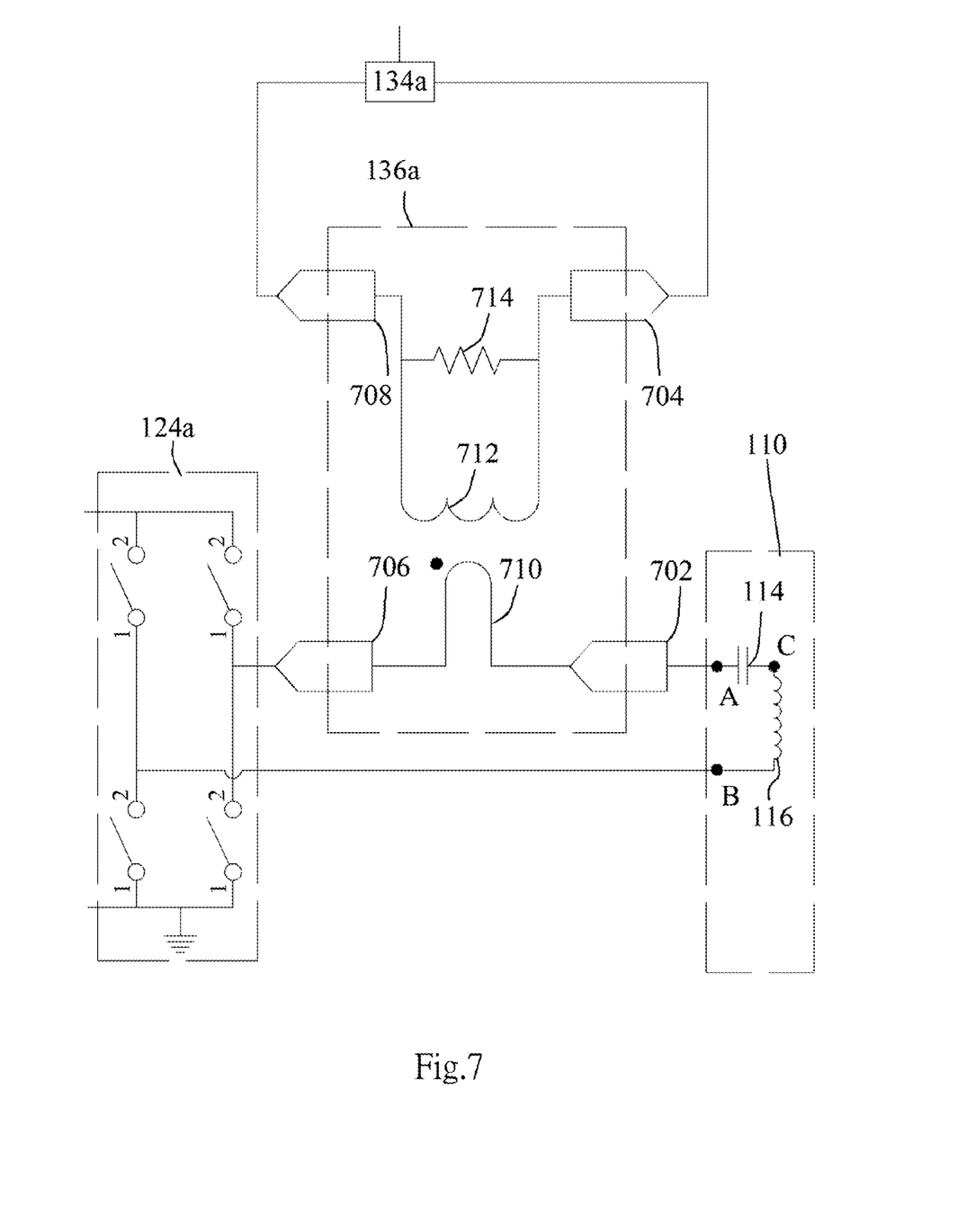
FIG. 7 illustrates a schematic view of one example of a wireless charging system of the FIG. 4A using a double output current-type driving circuit.

FIG. 7 is a schematic view of one example of a wireless charging system of the FIG. 4A, wherein the detector is a double output current-type detector. As shown in FIG. 7 and FIG. 4A, the detector 136a is a double output current-type detector located at a detection point of the induction loop 110, for example first detection point (A), the second detection point (B) or the third detection point (C), wherein a first signal input terminal 702 of the detector 136a is connected to the capacitor 114, a second signal input terminal 706 is connected to the driving device 124a; or the first signal input terminal 702 of the detector 136a is connected to the induction coil 116, a second signal input terminal 706 is connected to the capacitor 114; and a first signal output terminal 704 and a second signal output terminal 708 are connected to the filter 134a to detect current of the induction loop 110, and its differential current signal may be transmitted to the processor 144 via the detection circuit 132a.

Optionally, the double output current-type detector may be used in the auxiliary detection circuit 132b located at the first auxiliary detection point (P) or the second auxiliary detection point (Q) of the power loop 120. The first detection point (A), the second detection point (B) or the third detection point (C) of the inductive loop 110, or the first auxiliary detection point (P) of the power loop 120 may be connected by two double output current-type detectors at the same point, and subsequently connected to their respective filters to create different amplifications of current for providing the processor 144 to select preferable current signal.

Figure 8:
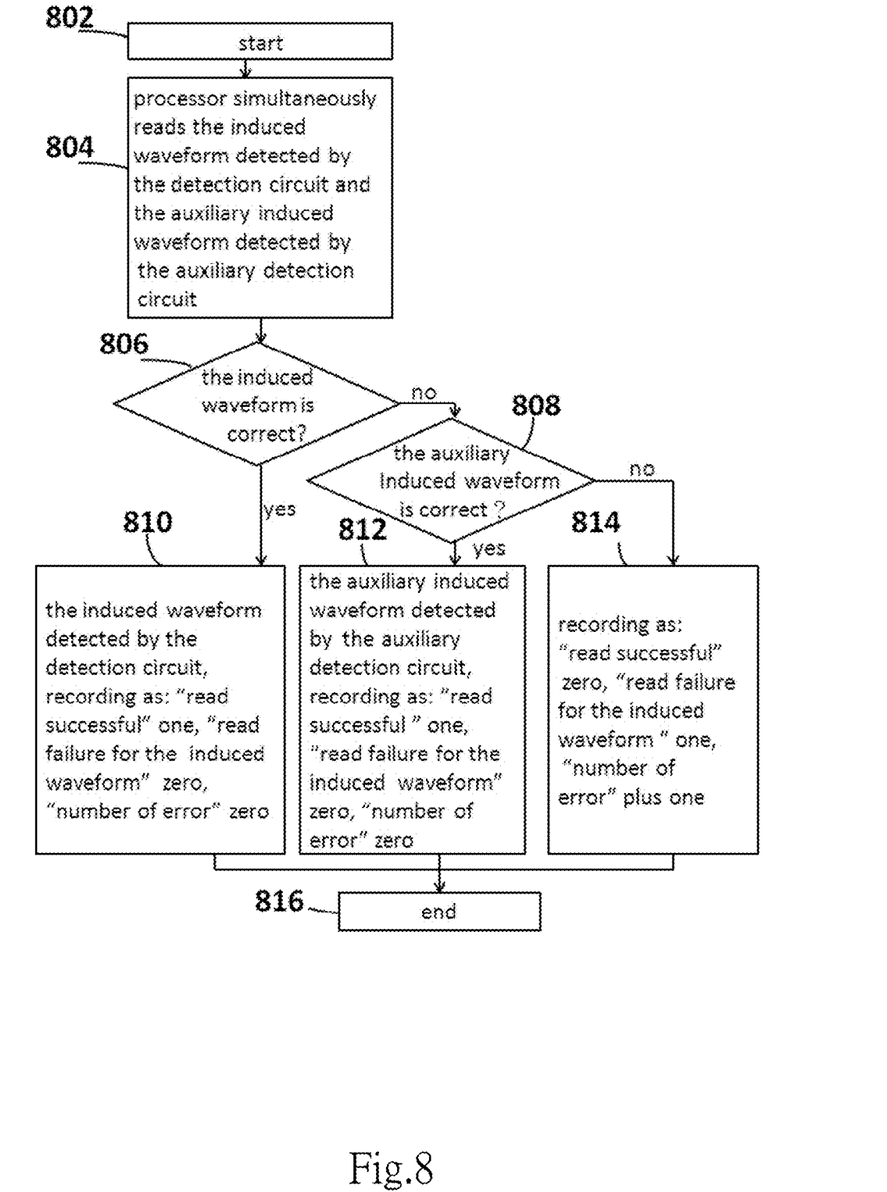
FIG. 8 illustrates a flow chart of performing of the wireless charging system with a double detection circuits according to one embodiment.

FIG. 8 is a flow chart of performing of the wireless charging system with a double detection lines. Please refer to the FIG. 4B and the FIG. 8, the processor 144 of the wireless charging system of the invention performs the following steps. Firstly, in step 802, it starts a process of determining an induced waveform. Next, in step 804, it simultaneously reads the induced waveform detected by the detection circuit 132a and the auxiliary induced waveform detected by the auxiliary detection circuit 132b. Then, in step 806, it examines to determine whether the induced waveform is correct or not by a protocol. If the answer is "yes" in the step 806, then followed by step 810, the induced waveform detected by the detection circuit 132a is applied and recording (stored) as "read successful" one, "read failure for the induced waveform" zero, "number of error" zero. If the answer is "no" in the step 806, then followed by step 808, it determines whether the auxiliary induced waveform is correct or not. If the answer is "yes" in the step 808, then followed by step 812, the auxiliary induced waveform detected by the auxiliary detection circuit 132b is applied and recording (stored) as "read successful" one, "read failure for the induced waveform" zero, "number of error" zero. If the answer is "no" in the step 808, then followed by step 814, it is recording (stored) as "read successful" zero, "read failure for the induced waveform" one, "number of error" plus one. After the steps 810, 812 and 814, the process is terminated in step 816.

Figure 9:
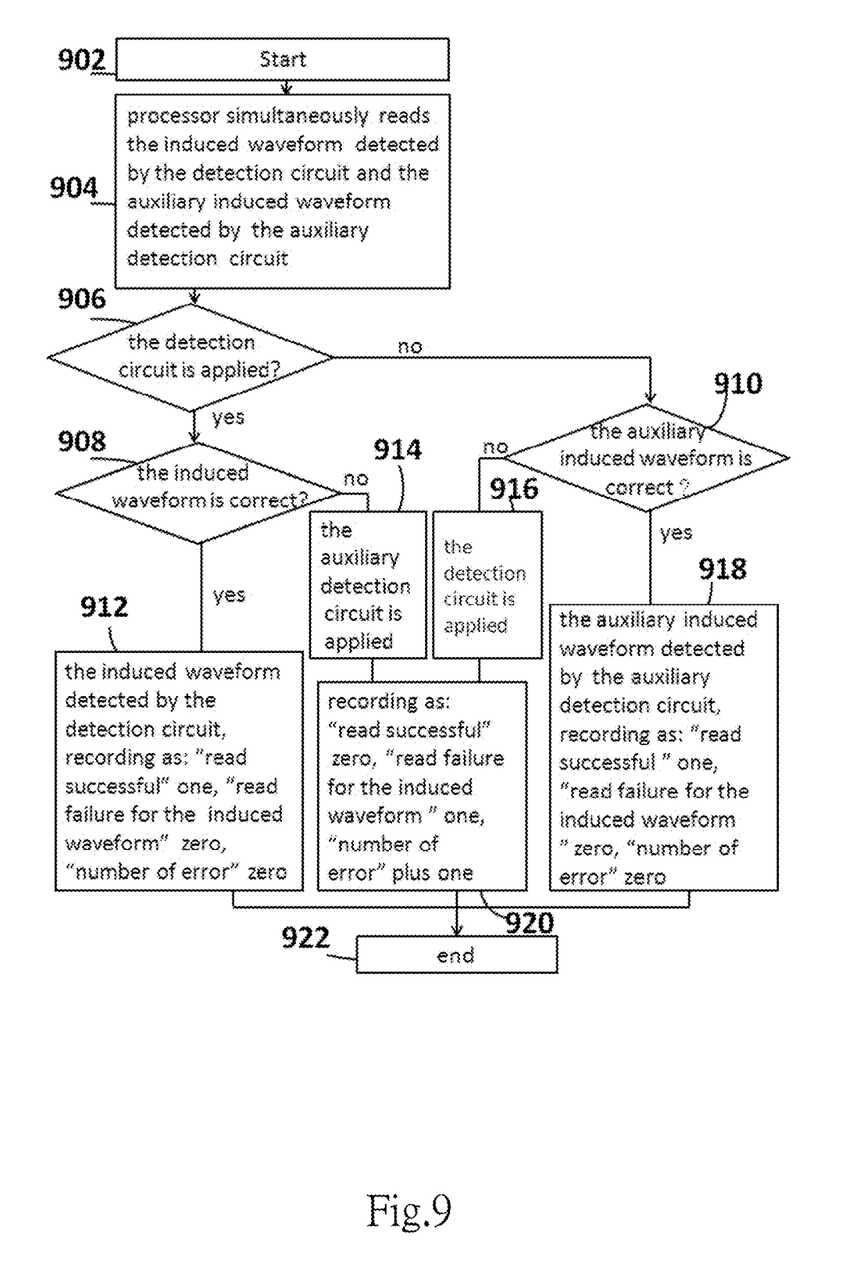
FIG. 9 illustrates a flow chart of performing of the wireless charging system with a double detection circuits according to another embodiment.

FIG. 9 is a flow chart of performing of the wireless charging system with a double detection lines according to another embodiment. Please refer to the FIG. 4B and the FIG. 9, the processor 144 of the wireless charging system of the invention performs the following steps. Firstly, in step 902, it starts a process of determining an induced waveform. Next, in step 904, it simultaneously reads the induced waveform detected by the detection circuit 132a and the auxiliary induced waveform detected by the auxiliary detection circuit 132b. Then, in step 906, it examines to determine whether the first channel of the detection circuit 132a is applied to connect or not. If the answer is "yes" in the step 906, then followed by step 908, it determines whether the induced waveform is correct or not. If the answer is "yes" in the step 908, then followed by step 912, the induced waveform detected by the detection circuit 132a is applied and recording (stored) as "read successful" one, "read failure for the induced waveform" zero, "number of error" zero. If the answer is "no" in the step 908, then followed by step 914, a second channel of the auxiliary detection circuit 132b is then applied.

If the answer is "no" in the step 906, then followed by step 910, it determines whether the auxiliary induced waveform is correct or not. If the answer is "yes" in the step 910, then followed by step 918, the auxiliary induced waveform detected by the auxiliary detection circuit 132b is applied and recording (stored) as "read successful" one, "read failure for the induced waveform" zero, "number of error" zero. If the answer is "no" in the step 910, then followed by step 916, the first channel of the detection circuit 132a is then applied.

After changing the channel in the steps 914 and 916, it proceeds to step 920 recording (storing) as "read successful" zero, "read failure for the induced waveform" one, "number of error" plus one. After the steps 912, 918 and 920, the process is terminated in step 922.

Figure 10:
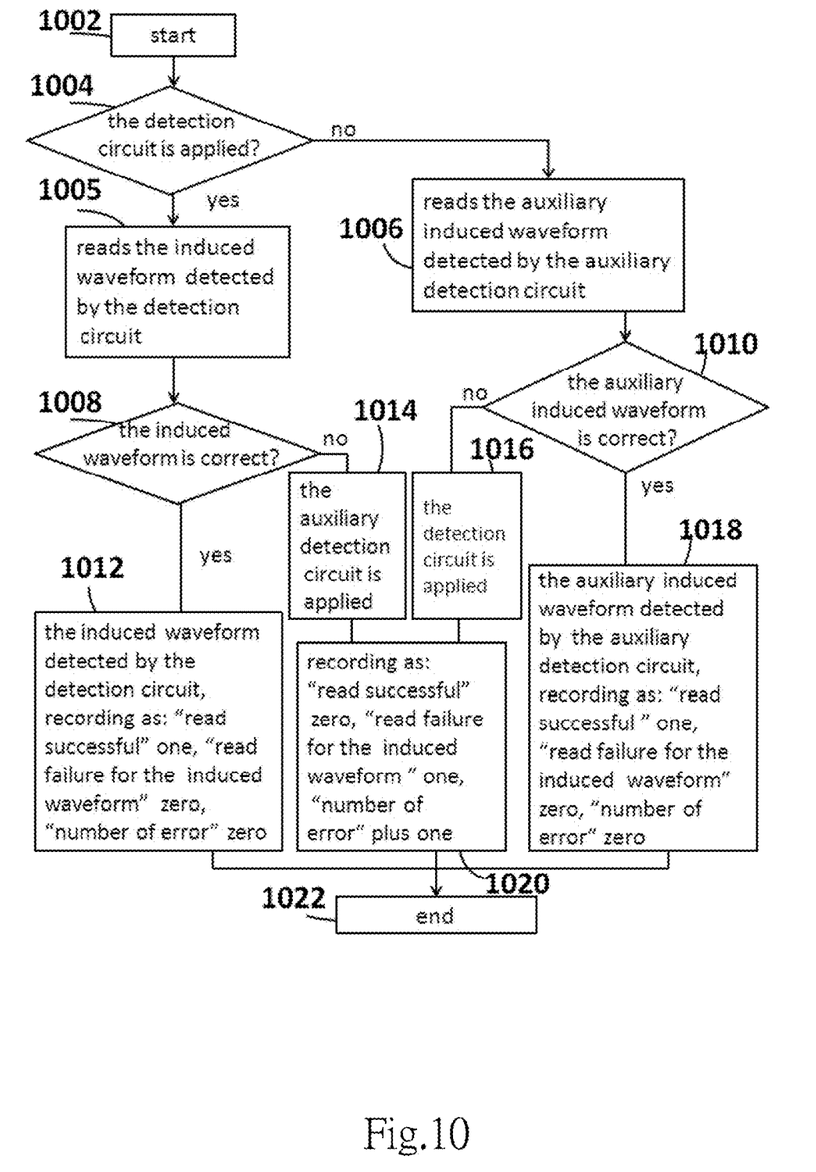
FIG. 10 illustrates a flow chart of performing of the wireless charging system with a double detection circuits according to yet another embodiment.

FIG. 10 is a flow chart of performing of the wireless charging system with a double detection lines according to yet another embodiment. Please refer to the FIG. 4B and the FIG. 10, the processor 144 of the wireless charging system of the invention performs the following steps. Firstly, in step 1002, it starts a process of determining an induced waveform. Next, in step 1004, it examines to determine whether the first channel of the detection circuit 132a is applied to connect or not. If the answer is "yes" in the step 1004, then followed by step 1005, it reads an induced waveform detected by the detection circuit 132a. Next, in step 1008, it determines whether the induced waveform is correct or not. If the answer is "yes" in the step 1008, then followed by step 1012, the induced waveform detected by the detection circuit 132a is applied and recording (stored) as "read successful" one, "read failure for the induced waveform" zero, "number of error" zero. If the answer is "no" in the step 1008, then followed by step 1014, a second channel of the auxiliary detection circuit 132b is then applied.

If the answer is "no" in the step 1004, then followed by step 1006, it reads an auxiliary induced waveform detected by the auxiliary detection circuit 132b. Next, in step 1010, it determines whether the auxiliary induced waveform is correct or not. If the answer is "yes" in the step 1010, then followed by step 1018, the auxiliary induced waveform detected by the auxiliary detection circuit 132b is applied and recording (stored) as "read successful" one, "read failure for the induced waveform" zero, "number of error" zero. If the answer is "no" in the step 1010, then followed by step 1016, the first channel of the detection circuit 132a is then applied.

After changing the channel in the steps 1014 and 1016, it proceeds to step 1020 recording (storing) as "read successful" zero, "read failure for the induced waveform" one, "number of error" plus one. After the steps 1012, 1018 and 1020, the process is terminated in step 1022.

It will be understood that the above descriptions of embodiments are given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A wireless charging system with auto-detection, comprising:
   an inductive loop including an induction coil and a capacitor, wherein said induction coil and said capacitor are connected in series;
   a power loop including a power source, wherein said power loop is connected to said inductive loop; and
   a control loop including:
      a processor;
      a detection circuit, coupled to said processor and a detection point of said inductive loop so that said processor can detect a variation of an induced electric field of said inductive loop due to an electric receiver device approaching to said inductive loop, wherein a first current or a first voltage of said inductive loop is created by said induced electric field as an induced waveform over time; and
      a control line, coupled to said processor and said power loop so that said processor can control a power supply of said power loop outputted to said inductive loop, wherein if said processor determines that said electrical receiver device is close enough to said inductive loop based on said variation of said induced electric field, said processor increases said power supply of said power loop outputted to said inductive loop,
   wherein said control loop includes an auxiliary control line coupled to said control loop to detect said induced electric field such that a current or a voltage of said power loop is created as an auxiliary induced waveform, and
   wherein as said processor determines that said induced waveform is not applicable, said induced waveform is replaced by said auxiliary induced waveform.

2. The system of claim 1, wherein said detection circuit of said control loop includes a filter, an input terminal of said filter is connected to said inductive loop, and an output terminal of said filter is connected to said processor.

3. The system of claim 2, wherein said induced waveform is changed from a sawtooth waveform to a curve waveform by said filter.

4. The system of claim 1, wherein said detection circuit of said control loop includes a detector located in said inductive loop.

5. The system of claim 4, wherein said detector is connected to said induction coil and said capacitor in series.

6. The system of claim 1, wherein said control line of said control loop is connected to said power source of said power loop so that said processor can control said power supply by controlling an output of said power source.

7. The system of claim 1, wherein said power loop includes a driving circuit, wherein an input terminal of said driving circuit is connected to said power source, and two output terminals of said driving circuit are connected to said capacitor and said induction coil respectively.

8. The system of claim 7, wherein said control loop includes an auxiliary control line, wherein said processor is connected to said auxiliary control line and said driving circuit so that said processor can control a phase or a frequency of said driving circuit to control said power supply.

9. The system of claim 8, wherein said driving circuit is a full-bridge driving circuit.

10. The system of claim 8, wherein said driving circuit is a half-bridge driving circuit.

11. The system of claim 8, wherein said processor can adjust said induced waveform by controlling said phase or said frequency of said driving circuit.

12. The system of claim 8, wherein said detection point is located between said driving circuit and said capacitor.

13. The system of claim 8, wherein said detection point is located between said driving circuit and said induction coil.

14. The system of claim 8, wherein said detection point is located between said capacitor and said induction coil.

15. The system of claim 8, wherein said power supply is increased as said induced waveform is changed.

16. The system of claim 8, wherein said power supply is increased as a maximum peak value or an average peak value of said induced waveform is over a pre-determined peak value.

17. The system of claim 8, wherein said power supply is increased as an area of said induced waveform is over a pre-determined value of area.

18. The system of claim 8, wherein a variation of said frequency of said induction wave is over a pre-determined value of frequency.

* * * * *